Nov. 24, 1959 — I. AMSTER — 2,914,767

LARGE PASS-BAND DIPLEXER

Filed April 23, 1956 — 2 Sheets-Sheet 1

Nov. 24, 1959 I. AMSTER 2,914,767

LARGE PASS-BAND DIPLEXER

Filed April 23, 1956 2 Sheets-Sheet 2

United States Patent Office 2,914,767

Patented Nov. 24, 1959

2,914,767

LARGE PASS-BAND DIPLEXER

Ignace Amster, Paris, France, assignor to Compagnie Generale de Telegraphie Sans Fil, a corporation of France

Application April 23, 1956, Serial No. 580,127

Claims priority, application France May 11, 1955

7 Claims. (Cl. 343—200)

The present invention relates to diplexers of the type used in television transmitters, for simultaneously feeding to a common antenna the outputs of a sound transmitter and an image transmitter, in such a way that the wave transmitted by one of the transmitters should not disturb the operation of the other.

Bridge type diplexers, which are most commonly used as offering the advantage of substantial impedance matching over a wide frequency band, may be used only with antennae having an even number of radiating elements such as super-turnstile antennae, antennae mounted on the four faces of a square section tower or mast, etc.

In order to save building costs, or to obtain a given radiation pattern, for instance a cloverleaf pattern, it is sometimes necessary to use aerials supported on the faces of a mast having a cross section which is triangular or is a polygon with a number of sides which is a multiple of three. In this case, bridge diplexers are unsuitable.

The present invention relates to a diplexer for an aerial comprising three radiating elements or groups of elements, of equal impedance and fed by at least one transmitter.

According to one embodiment of the invention, the diplexer comprises in combination; three main feeders, for respective connection at one end to three radiating elements, or groups of such elements, having the same impedance, and at the other end, to a first transmitter; three further feeders, each having a length substantially equal to an odd multiple of a quarter wave length corresponding to the medium frequency of the frequency band of the first transmitter, respectively connected to said main feeders for connection at their respective other ends to a second transmitter; and phase shifters imparting respectively phase-shifts of $$\frac{2\pi}{3} \text{ radians and } \frac{4\pi}{3} \text{ radians}$$

series connected in the respective portions of two of the main feeders, between the points of connection of the two transmitters.

In the case of television transmission, the first transmitter is the video transmitter and the second the sound transmitter.

Other features of the invention will become apparent from the ensuing description and the appended drawing given by way of example only and wherein.

Like elements are designated in the three figures by like reference characters.

Figure 1:
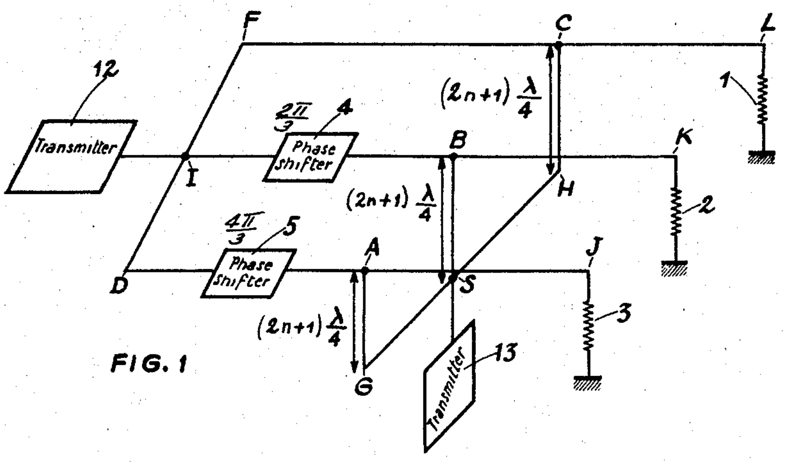
Fig. 1 is a block diagram of a first embodiment of the system according to the invention.

According to the embodiment shown in Fig. 1, three first feeders FCL, IBK and DAJ are respectively connected by one of their respective ends L, K and J to grounded radiating elements 1, 2, and 3 and by their other respective ends F, I and D to a first transmitter 12. Three second feeders CH, BS and AG are respectively connected to points CBA of the first feeders. The length of each of the second feeders is equal to $$(2n+1)\frac{\lambda}{4}$$

$\lambda$ being the wave length corresponding to the medium frequency of the frequency band of the transmitter and $n$ an integer number. The length of conductors GS and SH is assumed to be negligible. The three second feeders are parallel connected by their respective ends H, S and G to a second transmitter 13. Two phase shifters 4 and 5 of any known type are series inserted between points I and B, and D and A respectively. Phase-shifter 4 provides a phase-shift of $$\frac{2\pi}{3} \text{ radians}$$

and phase-shifter 5 provides a phase-shift of $$\frac{4\pi}{3} \text{ radians}$$

The system shown in Fig. 1 operates as follows: when transmitter 12 operates, phase-shifter 4 causes a phase-shift of $$\frac{2\pi}{3} \text{ radians}$$

in the signal applied to the feeder IBK and phase-shifter 5 a phase-shift of $$\frac{4\pi}{3} \text{ radians}$$

in the same signal applied to the feeder DAJ. Assuming the system to be balanced, i.e., the impedances of the radiating elements 1, 2 and 3 to be equal, the vector sum at point S of the voltages issued from the transmitter 12 is equal to zero. In the same way, the vector sum at point I of the voltages issued from transmitter 13 is also zero. Besides, since the length of feeders CH, BS and AG is equal to an odd multiple of $\lambda/4$, the whole arrangement in derivation at the points A, B and C is viewed from these points A, B and C with an infinite impedance. Therefore it does not affect the propagation of the energy fed by transmitter 12 towards the radiating elements 1, 2 and 3.

Thus, the invention provides a system having three radiating elements, or groups of elements 1, 2, 3 which are fed by transmitter 12 in a three-phase arrangement with phase-shifts of 120° between two successive elements, and in phase by transmitter 13, without any interference between the two transmitters 12 and 13.

The device according to Fig. 1 implies a perfect matching over the whole operating band between each radiating element, or group of elements, and the corresponding feeder; otherwise, a certain amount of energy is likely to be reflected and to disturb the operation of the transmitters or to be transmitted as an echo.

Figure 2:
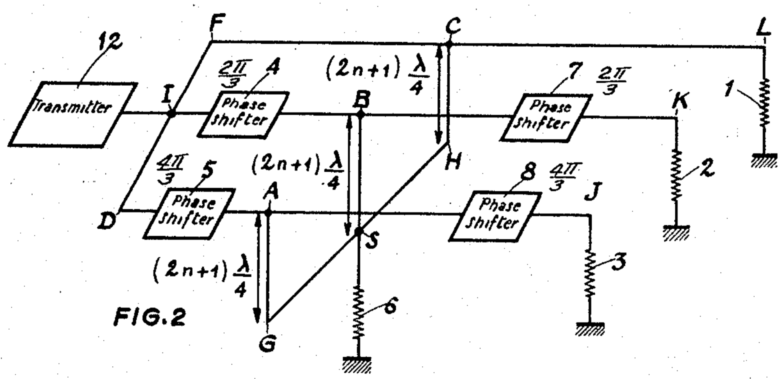
Fig. 2 is a block diagram of a further embodiment of the invention for use with one transmitter only.

Fig. 2 shows an improved embodiment of the system according to the invention, which avoids the latter disadvantage, and considerably increases the width of the frequency band inside which the "radiating element-feeder" appears properly matched. As shown, the system is for one transmitter only.

In Fig. 2 a resistor 6 is connected between point S and the ground and two phase-shifters 7 and 8, respectively similar to phase-shifters 4 and 5, are inserted into feeder portions BK and AJ respectively.

The following chart summarizes the respective phases in radians of the waves at the main points of the feeders FL, IK, and DJ, assuming there is mismatch between these feeders and the radiating elements 1, 2 and 3.

| | Feeder FL | Feeder IK | Feeder DJ |
|---|---|---|---|
| Forward direction: Points C, B and A | 0 | $\frac{2\pi}{3}$ | $\frac{4\pi}{3}$ |
| Points L, K and J | 0 | $\frac{4\pi}{3}$ | $\frac{8\pi}{3}=\frac{2\pi}{3}$ |
| Backward direction: Points C, B and A | 0 | $\frac{6\pi}{3}=2\pi=0$ | $\frac{12\pi}{3}=4\pi=0$ |
| Points F, I and D | 0 | $\frac{2\pi}{3}$ | $\frac{4\pi}{3}$ |

This table does not take into account the phase-shifts caused by the reflections on impedances 1, 2 and 3 since the latter are assumed to be equal; the supplementary phase-shift is the same on the three feeders and the relative phase of the feeders is thus not affected.

From the above chart, it is seen that, in the forward direction, the signals issued from the transmitter 12 and propagated along the three feeders cannot propagate towards resistor 6, since, as already mentioned, the sum of the voltage is nil at S.

In the backward direction, the reflected waves due to mismatch between the feeders and the corresponding radiating elements are in phase at points CBA. They may therefore propagate along the derivation and dissipate in resistance 6. However, they cannot disturb transmitter 12, the sum of the reflected voltages at point I being zero.

Thus, if elements 1, 2 and 3 have equal impedance, even though they are mismatched with respect to the corresponding feeders, this does not affect the propagation of the waves from transmitter 12 in the forward direction, while the reflected waves dissipate in the compensating resistor 6, without disturbing the operation of transmitter 12.

Further, theory and experience show that the arrangement described may operate in a wide frequency band. As is known, it is normally essential in television to have matched radiating elements. With the system of the present invention satisfactory results were achieved in the 160–200 mc./s. frequency band with mismatched identical radiating elements.

The portion of the energy dissipated in resistor 6 is low and is equal to the square of the reflection coefficient of elements 1, 2 and 3; generally not more than 4% of the energy is dissipated, which corresponds to 0.2 db.

Figure 3:
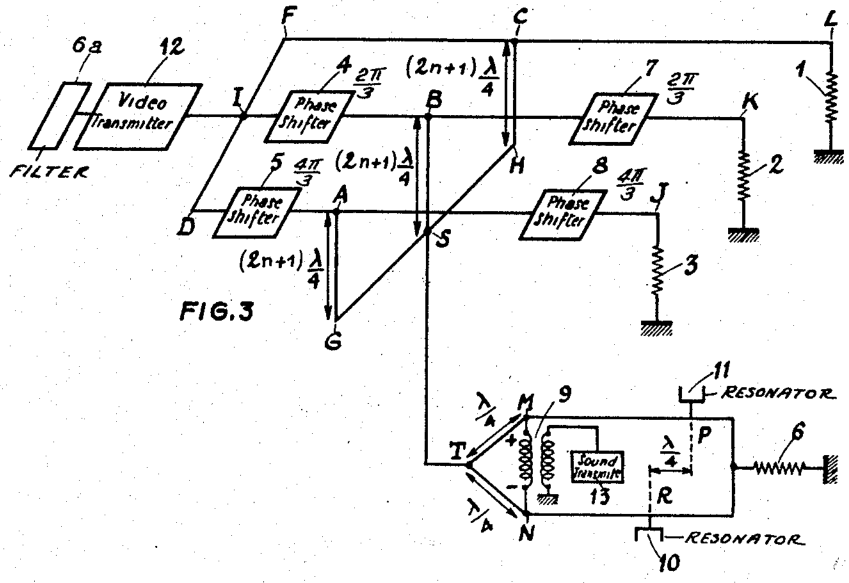
Fig. 3 illustrates a block diagram of a still further embodiment of the invention, including the embodiment of Figure 2.

Fig. 3 shows the block diagram of an embodiment of the invention as applied in practice to television. This embodiment results from the combination of the circuits represented in Figs. 1 and 2. Transmitter 12 is a video transmitter and transmitter 13 a sound transmitter. The arrangement operates as described above.

On account of the presence of resistor 6, a bridge circuit, known per se, must be used for connecting sound transmitter 13. Sound transmitter 13 feeds the primary of a transformer 9, the secondary of which forms a diagonal NM of the bridge, in such a manner that the supply voltages in M and N are in phase opposition. Two resonators 10 and 11, tuned on the frequency of transmitter 13 and spaced $\lambda/4$ apart, prevent, as known, the energy of the sound transmitter 13 from being dissipated in resistance 6 and reflect it back. Accordingly, the total phase shift, which the waves propogated from points N and M undergo during their respective travels from M to P then back from P to T, and from N to R, then back from R to T, is such that both waves are again in phase at T.

The portion of the energy originating from the video transmitter 12 and reflected at the points L, K and J, dissipates in resistor 6 and does not interfere with transmitter 13.

It is obvious that a similar filter may also be used with the video transmitter 12 as diagrammatically shown at 6*a*, to prevent the reflected waves originating from transmitter 13 from interfering with the operation of the video transmitter 12. More generally, the same system can be applied for coupling any two transmitters to a common triphased load.

It is to be understood that the invention is in no way limited to the embodiments described and illustrated only by way of example.

I claim:

1. A system for coupling three radiating elements to at least one transmitter, said system comprising: three main feeders respectively connected for feeding said elements and parallel connected to a common point for connection to said transmitter; three further feeders having a same length substantially equal to an odd multiple of a quarter wave length corresponding to the median frequency of the operating frequency band of the system, each connected to a different main feeder and parallel connected to a second point; and phase-shifting means series connected in two of said main feeders between said common point and said further feeders for respectively providing a phase-shift of $$\frac{2\pi}{3} \text{ and } \frac{4\pi}{3} \text{ radians}$$

2. A system for coupling three radiating elements to two transmitters, said system comprising: three main feeders respectively connected for feeding said elements and parallel connected to a common point for coupling to a first transmitter; three further feeders having a same length substantially equal to an odd multiple of a quarter wave length corresponding to the median frequency of the operating frequency band of the system, each connected to a different main feeder and parallel connected to a second point for coupling to a second transmitter; and phase-shifting means, series connected in two of said main feeders between said common point and said further feeders for respectively providing a phase-shift of $$\frac{2\pi}{3} \text{ and } \frac{4\pi}{3} \text{ radians}$$

3. A system for coupling three radiating elements to at least one transmitter, said system comprising: three main feeders respectively connected for feeding said elements and parallel connected to a common point for connection to said transmitter; three further feeders having a same length substantially equal to an odd multiple of a quarter wave length corresponding to the median frequency of the operating frequency band of the system, each connected to a different main feeder and parallel connected to a second point; a resistor connected to said second point; and phase-shifting means series connected in two of said main feeders between said common point and said further feeders for respectively providing a phase-shift of $$\frac{2\pi}{3} \text{ and } \frac{4\pi}{3} \text{ radians}$$

4. A system for coupling three radiating elements to two transmitters, said system comprising: three main feeders respectively connected for feeding said elements and parallel connected to a common point for coupling to a first transmitter; three further feeders having a same length substantially equal to an odd multiple of a quarter wave length corresponding to the median frequency of the operating frequency band of the system, each connected to a different main feeder and parallel connected to a second point for connecting to a second transmitter; a resistor connected to said second point and uncoupled from said second transmitter; and phase-shifting means series connected in two of said main feeders between said common point and said further feeders for respectively providing a phase-shift of $$\frac{2\pi}{3} \text{ and } \frac{4\pi}{3} \text{ radians}$$

5. A system for coupling three radiating elements to at least one transmitter, said system comprising: three main feeders respectively connected for feeding said elements and parallel connected to a common point for coupling to a first transmitter; a first resistor connected to said common point and uncoupled from said first transmitter; three further feeders having a same length substantially equal to an odd multiple of a quarter wave length corresponding to the median frequency of the operating frequency band of the system, each connected to a different main feeder and parallel connected to a second point for coupling to a second transmitter; a second resistor connected to said second point and uncoupled from said second transmitter; and phase-shifting means series connected in two of said main feeders between said first point and said further feeders for respectively providing a phase-shift of $$\frac{2\pi}{3} \text{ and } \frac{4\pi}{3} \text{ radians}$$

6. A system for coupling three radiating elements to two transmitters, said system comprising: three main feeders respectively connected for feeding said elements and parallel connected to a common point for coupling to a first transmitter; three further feeders having a same length substantially equal to an odd multiple of a quarter wave length corresponding to the median frequency of the operating frequency band of the system, each connected to a different main feeder and parallel connected to a second point for coupling to a second transmitter; phase-shifting means series connected in two of said main feeders between said common point and said further feeders for providing respectively a phase-shift of $$\frac{2\pi}{3} \text{ and } \frac{4\pi}{3} \text{ radians}$$

and further phase-shifting means respectively series connected in the same main feeders between said further feeders and said three radiating elements for providing respectively a phase-shift of $$\frac{2\pi}{3} \text{ and } \frac{4\pi}{3} \text{ radians}$$

7. A diplexer system for three radiating elements, said system comprising: three main feeders respectively connected for feeding said elements and parallel connected to a common point; three further feeders having a same length substantially equal to an odd multiple of a quarter wave length corresponding to the median frequency of the operating frequency band of the system, each connected to a different main feeder and parallel connected to a second point; and phase shifting means series connected in two of said main feeders between said common point and said further feeders for respectively providing a phase-shift of $$\frac{2\pi}{3} \text{ and } \frac{4\pi}{3} \text{ radians}$$

References Cited in the file of this patent

UNITED STATES PATENTS

| | | |
|---|---|---|
| 2,017,886 | Barden | Oct. 22, 1935 |
| 2,253,958 | Luck | Aug. 6, 1941 |
| 2,267,550 | Brown | Dec. 23, 1941 |
| 2,286,839 | Schelkunoff | June 16, 1942 |
| 2,413,396 | Weagant | Dec. 31, 1946 |
| 2,818,501 | Stavis | Dec. 31, 1957 |

FOREIGN PATENTS

| | | |
|---|---|---|
| 601,575 | Great Britain | May 7, 1948 |